United States Patent
Reize et al.

(10) Patent No.: US 7,845,736 B2
(45) Date of Patent: Dec. 7, 2010

(54) METHOD AND DEVICE FOR OPEN- AND/OR CLOSED-LOOP CONTROL OF A GENERATOR IN A VEHICLE

(75) Inventors: Andreas Reize, Adelsheim (DE); Frank Kaestner, Bietigheim-Bissingen (DE); Juergen Hachtel, Moeckmuehl (DE); Markus Hutt, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 764 days.

(21) Appl. No.: 11/821,842

(22) Filed: Jun. 25, 2007

(65) Prior Publication Data

US 2008/0032862 A1  Feb. 7, 2008

(30) Foreign Application Priority Data

Jun. 23, 2006 (DE) .................. 10 2006 028 925

(51) Int. Cl.
*B60T 13/16* (2006.01)
*B60T 13/66* (2006.01)
(52) U.S. Cl. .......................... 303/10; 303/20
(58) Field of Classification Search ............ 303/10, 303/11, 20, 161; 701/36; 180/65.31, 69.3; 290/31, 46
See application file for complete search history.

(56) References Cited

U.S. PATENT DOCUMENTS

| 6,389,349 | B1 * | 5/2002 | Hachtel | 303/11 |
| 2003/0036833 | A1 * | 2/2003 | Kobayashi | 701/36 |
| 2004/0267417 | A1 * | 12/2004 | Matsui et al. | 701/36 |
| 2008/0040012 | A1 * | 2/2008 | Kuzel et al. | 701/70 |

FOREIGN PATENT DOCUMENTS

| DE | 10238427 A1 * | 5/2003 |
| DE | 10 2005 060859 | 6/2007 |

* cited by examiner

*Primary Examiner*—Thomas J Williams
(74) *Attorney, Agent, or Firm*—Kenyon & Kenyon LLP

(57) ABSTRACT

A method and a device for the open- and/or closed-loop control of a generator or a dynamo in a vehicle. The generator supplies, at least part of the time, an electric motor located in a braking system, e.g., a pump motor, with electrical power. A main feature is that the generator is activated as a function of the pressure in the brake master cylinder, it being activated as soon as the pressure in the brake master cylinder exceeds an initial threshold value.

11 Claims, 2 Drawing Sheets

METHOD AND DEVICE FOR OPEN- AND/OR CLOSED-LOOP CONTROL OF A GENERATOR IN A VEHICLE

FIELD OF THE INVENTION

The present invention is directed to a method and a device for open- and/or closed-loop control of a generator to supply electrical power to an electric motor located in the braking system of a vehicle.

BACKGROUND INFORMATION

A method and a device for open- and/or closed-loop control of an electric motor are described in German Patent Application No. DE 10 2005 060859 (not a prior publication), in which the electric motor is powered by a generator. Here, the high-frequency pulse-width modulation used to provide open- and/or closed-loop control is utilized for continuously increasing the current required to operate the electric motor.

SUMMARY OF THE INVENTION

The present invention describes a method and a device for open- and/or closed-loop control of a generator or a dynamo in a vehicle. It is provided that the generator supplies electrical power, at least part of the time, to an electric motor in a braking system, such as a pump motor. A main feature of the present invention is that the generator is activated as a function of the pressure in the brake master cylinder, it being provided that the generator is activated as soon as the pressure in the brake master cylinder exceeds an initial threshold value. This makes it advantageously possible to ensure an adequate supply of electrical power to the electric motor.

In one embodiment of the present invention it is furthermore provided that the generator is activated in an initial step, so that a sufficient supply of electrical power to operate the electric motor is available. It is advantageously provided that the electric motor is operated under load only in a second step. Between the first and the second steps a delay may be provided for, which may be stipulated as a function of the current gradient which may be produced by the generator. Since operating the electric motor under load requires a higher level of electrical current than idling it, the delay makes it possible to ensure an adequate supply of electrical power to the electric motor.

The electric motor may be set in operation when the generator is activated, and it is idled until a second threshold value for the pressure in the brake master cylinder is reached. As an alternative, it may also be provided that the electric motor is activated only after the second threshold value has been exceeded and is then to be operated immediately under load.

In order to enable early activation of the generator and therefore an adequate run-up for current generation, it is provided that the initial threshold value, at which the generator is activated, is set lower than the second threshold value, at which the electric motor is operated under (full) load. It is advantageous if the second threshold value is stipulated as a function of the pressure level at which one wheel brake in the braking system locks up. This lock-up pressure level may be sensed within an ABS/ESP controller and signals the point in time at which the pump in the braking system must be activated in order to reduce the pressure in at least one wheel brake.

In a further embodiment of the present invention, it is provided that the generator is activated in response to the change in the pressure in the brake master cylinder. Here it is possible to detect whether there is an imminent intent to rapidly change the pressure in at least one wheel brake in the braking system, in order to ensure the prompt supply of electrical power to the electric pump in the braking system whose function is to reduce the pressure.

DETAILED DESCRIPTION

Figure 1:
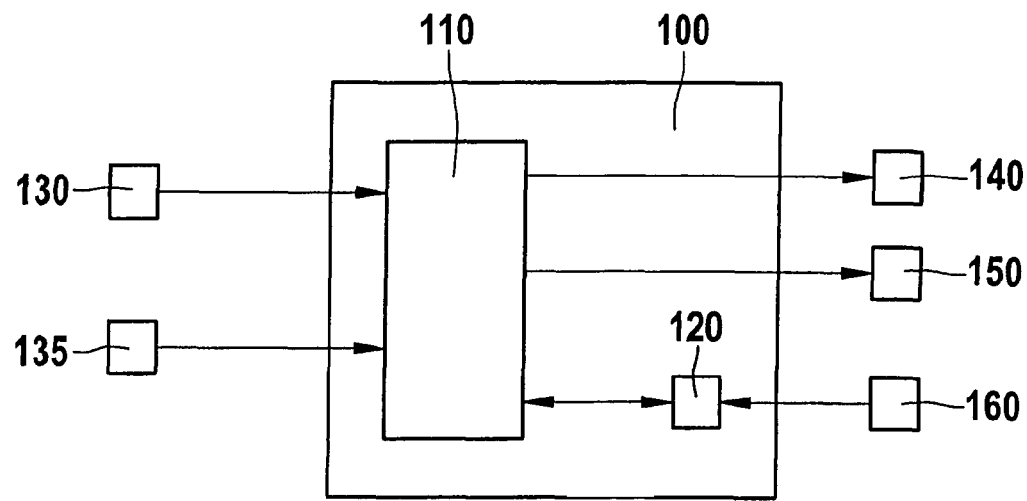
FIG. 1 shows schematically in a block diagram a device according to the present invention for open- and/or closed-loop control of a generator or of an electric motor.

When an electrically driven pump motor is operated as part of an ABS/ESP braking system, then, in the event of a high wheel pressure and consequently a high load torque during the run-up of the motor, there may be a high demand for current, possibly resulting in a collapse of the voltage in the vehicle's electrical system. As a result of such a collapse the motor may be unable to start up quickly enough and unable to reduce quickly enough the braking pressure at the wheel that has locked up. One possible way of preventing such a collapse of the voltage in the vehicle's electrical system is to activate a generator or the vehicle's dynamo, in order to compensate for the increased demand for electrical power. Since typical generators, however, are designed with current gradients of approximately 300 A/s to 1000 A/s, the current required for the operation of the pump motor cannot be supplied immediately after the generator starts.

In order to provide the current required for the operation of the pump motor in a timely manner, it is provided that the generator is started before the pump motor starts or before full load is reached, taking the current gradient of the generator into account.

To this end a processing unit 110 is provided within a control unit 100, which detects an admission pressure $p_{admission}$. This admission pressure signal $p_{admission}$ may, for example, represent the pressure in brake master cylinder 130 and thus the intent of the driver to brake. As an alternative the admission pressure signal may, however, also represent the pressure in the brake on at least one of the wheels. Furthermore, processing unit 110 determines the lock-up pressure level in at least one of the vehicle's wheel brakes with the aid of a suitable device 135. ABS or ESP systems may be utilized here as typical devices to sense such lock-up and thereby to detect the lock-up pressure level.

If the detected admission pressure signal $p_{admission}$ and under certain circumstances also the lock-up pressure level result in the decision that a response of the pump in the braking system with a high load torque is imminent, for example in order to reduce the pressure at one wheel brake owing to a sensed or imminent lock-up, then generator 140 is activated by processing unit 110, before pump motor 150 is operated to reduce the pressure. The dependence of the activation of the generator on the admission pressure signal or the response to the lock-up pressure level and the time delay between the activation of the generator and the electric motor are stipulated in the form of one or more characteristic curves, which processing unit 110 can access.

In order to make it possible to adjust the dependencies between the admission pressure signal and the activation of the generator, a memory 120 is provided, from which processing unit 110 can read differing characteristic curves as required. These characteristic curves may be modified if necessary, for example using an external input unit 160 via an interface if individual components of the braking system such as pump motor 150 or generator 140 are replaced.

Figure 2:
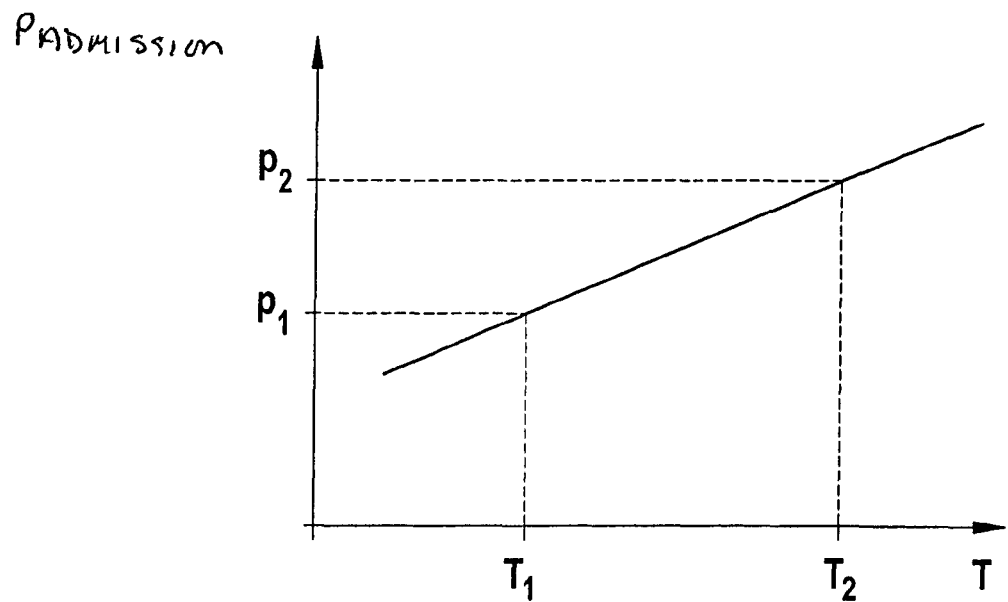
FIG. 2 shows in a graph the relationships of the activation moments relative to the sensed admission pressure levels.

A typical characteristic curve, showing a relationship between admission pressure $p_{admission}$ and the activation times for generator 140 or electric motor 150, is shown in FIG. 2. Here, value $p_2$ corresponds to a lock-up pressure at one of the vehicle's wheel brakes. At the latest when this lock-up pressure is reached at point in time $T_2$, the pump is activated in order to reduce the excessively high braking pressure in the wheel brake. Thus, starting from point in time $T_2$ pump motor 150 will require a sufficiently high power supply for its operation, and this, owing to the limited capacity of the on-board battery, has to be supplied by generator 140, in order to prevent a collapse of the voltage in the vehicle's electrical system. According to the present invention this supply of electrical current is made possible by the timely activation of generator 140. Taking into account the current gradient of generator 140, in other words the maximum current that can be produced by the generator during running up to speed, makes it possible to calculate in advance at what point in time $T_1$ before lock-up pressure $p_2$ is reached, and thus before full-load operation of pump motor 150, generator 140 must be activated. As a function of the time difference thus obtained $(T_2-T_1)$, and assuming that the rise in admission pressure $p_{admission}$ is linear, it is possible to determine an initial threshold value $p_1$. When this threshold value $p_1$ is reached, generator 140 is activated.

In another exemplary embodiment, in addition to the linear pressure rise shown in FIG. 2, differently shaped characteristic curves may also be used. Furthermore, consideration may also be given to detecting admission pressure $p_{admission}$ as a function not of the brake master cylinder pressure but of one or more wheel brake pressures.

Figure 3:
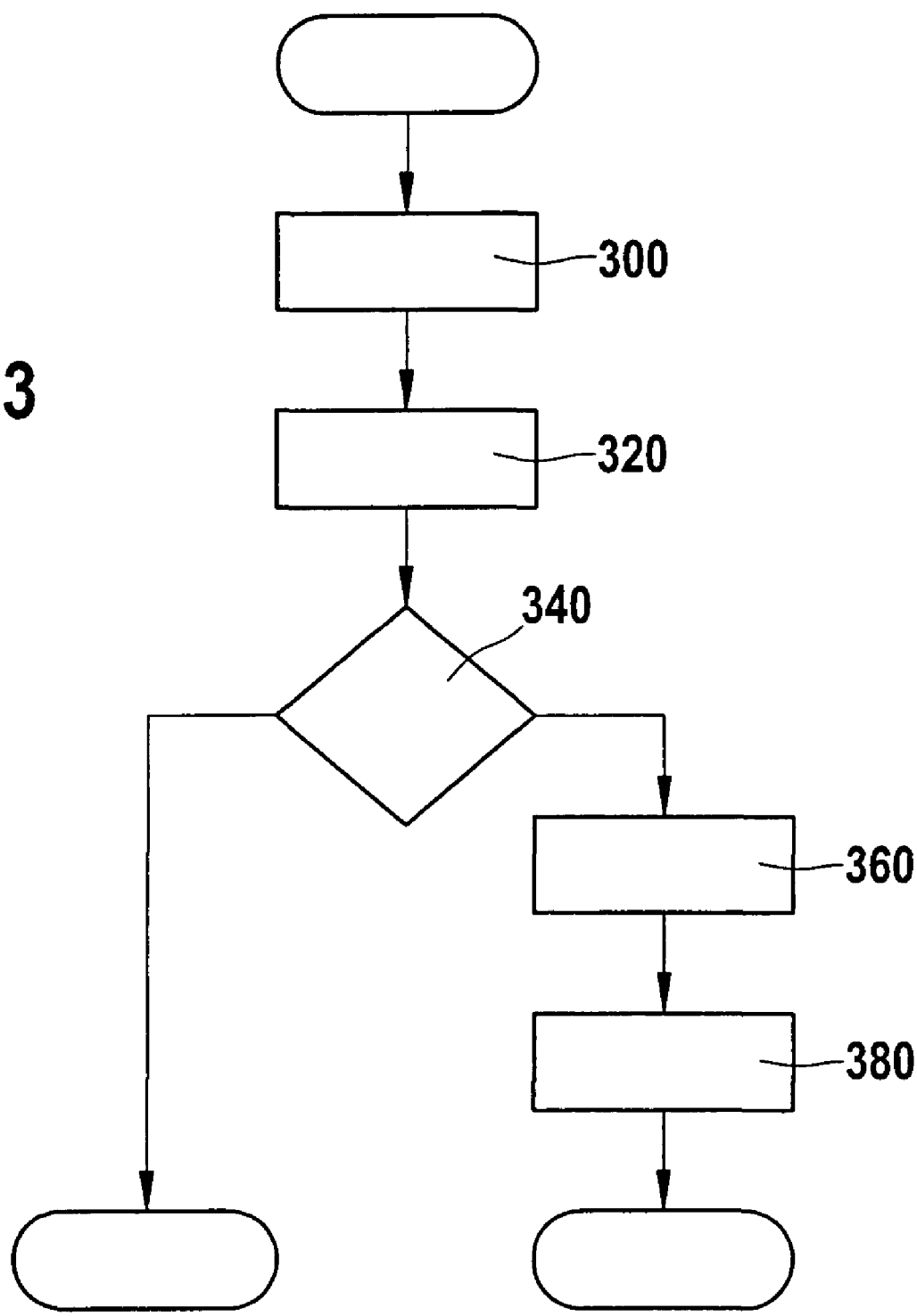
FIG. 3 shows a possible open-/closed-loop control algorithm with the aid of a flow chart.

A possible open- or closed-loop control strategy for the present invention is shown by the flow chart in FIG. 3. Once the appropriate algorithm has started, in a first step 300 admission pressure $p_{admission}$ ($T_1$) at point in time $T_1$ is detected. As already stated, this may be either the pressure in the brake master cylinder or one of the wheel brake pressures. Since this admission pressure signal is normally accompanied by signal noise, the signal is filtered in order to remove the high frequency components. In addition, lock-up pressure $p_2$ is determined, with the relevant value being ascertainable in different ways. One possibility, for example, is reading the value in directly from the ABS controller in the vehicle's ABS system.

Next the detected admission pressure signal $p_1$ is differentiated in step 320, in order to be able to predict the rise in the admission pressure. In step 340 the decision is made whether according to $$P_1+d/dt(p_1*(T_2-T_1))\geqq p_2$$

the rise in admission pressure $p_{admission}$ at point in time $T_1$ will cause admission pressure $p_{admission}$ after the passage of time $(T_2-T_1)$ to exceed the second threshold value $p_2$, which represents the lock-up pressure. If this is the case, it is thereby understood that an increased demand for electrical power to operate pump motor 150 will occur at point in time $T_2$. Thereupon in step 360 generator 140 is activated, in order to be able to produce at point in time $T_2$ the level of current called for at that time.

As an option, a step 380 may also be provided in which not only generator 140 is activated but also pump motor 150. In this case, however, it is provided that up to point in time $T_2$ pump motor 150 is operated essentially only at idle. This has the advantage that in the event the brakes lock up, pump motor 150 will reach operation under full load more quickly, in order to be able to reduce the high wheel brake pressure.

Since the lock-up pressure level may vary with driving conditions, in a further exemplary embodiment it may be provided, for example, that brake fade may be taken into account in the calculation of value $p_2$ and in creating the characteristic curve and thus in calculating value $p_1$. In addition, however, it is also conceivable to take other influencing variables that result in a change in the lock-up pressure into consideration in creating or modifying the characteristic curve. This consideration may naturally also be undertaken during operation of the braking system, for example during step 300 of the algorithm in FIG. 3.

What is claimed is:

1. A method for at least one of open-loop control and closed-loop control of a generator of a vehicle, the generator supplying, at least part of the time, an electric motor in a braking system of the vehicle with electrical power, the method comprising:

activating the generator as a function of a comparison of a pressure in a brake master cylinder with a first threshold value.

2. The method according to claim 1, wherein, in a first step, the generator is activated and in a second step the electric motor is operated under load, a delay which is a function of a current gradient of the generator being stipulated between the activation of the generator in the first step and the operation of the electric motor in the second step.

3. The method according to claim 2, wherein the electric motor is activated for operation under load in the second step as a function of a comparison of the pressure in the brake master cylinder with a second threshold value, the electric motor being idled until the pressure in the brake master cylinder reaches a second threshold value.

4. The method according to claim 3, wherein the first threshold value is set lower than the second threshold value, the second threshold value being stipulated as a function of a lock-up pressure level in one wheel brake situated in the braking system.

5. The method according to claim 1, wherein the generator is activated as a function of a change in the pressure in the brake master cylinder.

6. The method according to claim 2, wherein the electric motor is activated in the second step as a component of a pump for reducing a pressure in the braking system during ABS braking.

7. A device for at least one of an open-loop control and a closed-loop control of a generator of a vehicle, the generator supplying, at least part of the time, an electric motor in a braking system of the vehicle with electrical power, the device comprising:

an arrangement for activating the generator as a function of a comparison of a pressure in a brake master cylinder with a first threshold value.

8. The device according to claim 7, wherein the arrangement operates the generator in a first step and operates the electric motor under load in a second step, a delay which is a function of a current gradient of the generator being provided for between the activation of the generator in the first step and the operation of the electric motor in the second step.

9. The device according to claim 8, wherein the arrangement detects the pressure in the brake master cylinder and the electric motor is idled until a second threshold value is reached.

10. The device according to claim 7, wherein the generator is activated as a function of a change in the pressure in the brake master cylinder.

11. The device according to claim 9, wherein the second threshold value is stipulated as a function of a lock-up pressure level in one wheel brake in the braking system and the electric motor is activated in the second step as a component of a pump for reducing a pressure in the braking system during ABS braking.

* * * * *